3,188,285
ELECTRODE ASSEMBLY
Hideo Watanabe and Lynn B. Leonard, Fullerton, and Maurice L. Deushane, Whittier, Calif., assignors to Beckman Instruments, Inc., a corporation of California
Filed Sept. 26, 1961, Ser. No. 140,900
9 Claims. (Cl. 204—195)

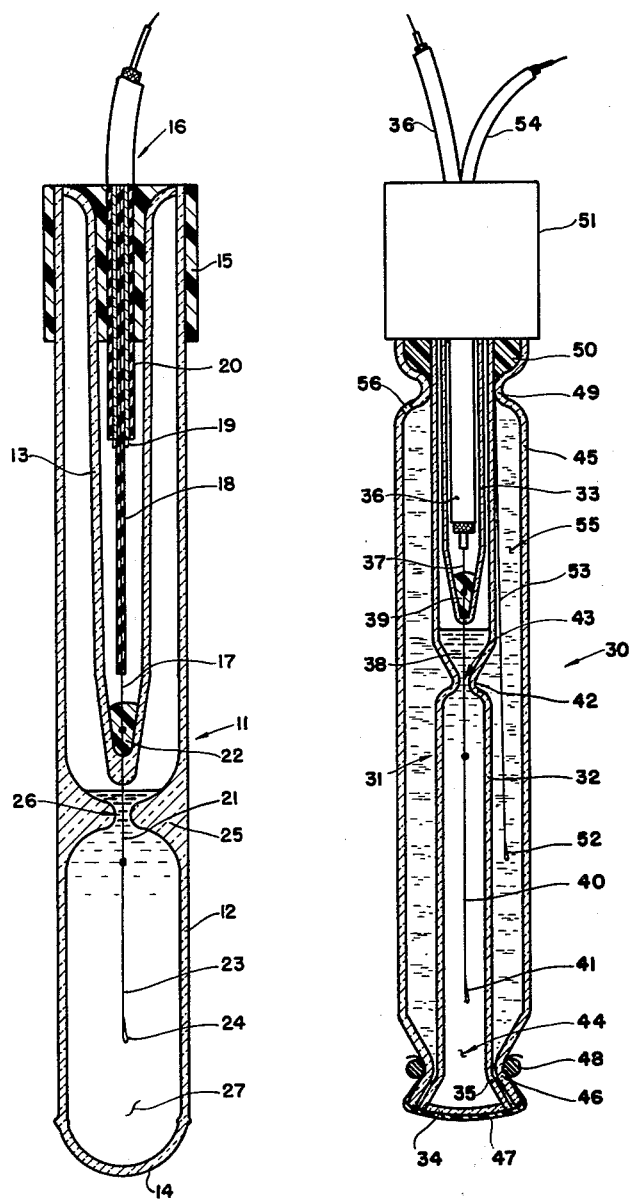

This invention relates to electrode assemblies for use in electrochemical analyses and more particularly relates to such electrode assemblies which are adaptable for use in any physical orientation.

In many electrochemical electrode assemblies, a body of electrolyte must be maintained in contact with one surface of a membrane, the other surface of which may be exposed to another electrolyte or the medium to be analyzed. The almost universally used technique to maintain contact between a liquid electrolyte and a membrane is to incorporate the membrane as a portion of the walls of a vessel, the electrolyte being maintained in contact with the membrane in the lower part of the vessel by the force of gravity. At a level higher than the liquid level of the electrolyte, the vessel may, if desired, be provided with an opening for exchanging or refilling the electrolyte if such is required. It will be clear that, in such electrode structures, the contact between the electrolyte and the membrane is maintained by hydrostatic pressure and depends on the physical orientation of the electrode assembly.

In some circumstances, however, it is not possible to rely on the force of gravity for maintaining contact between the membrane and the electrolyte. For instance, some electrode assemblies, such as glass electrode assemblies employed for certain physiological measurements, must be inserted into living organisms. In such applications it is not always possible to orient the organism so that an electrode assembly having a sensitive membrane at the lower end of a tubular stem can be inserted vertically into the organism. Sometimes it is only possible to insert the electrode at an angle other than substantially vertical with the glass membrane at the lower end, thereby causing the electrolyte to be removed from contact with the membrane and destroying operability of the electrode.

In an attempt to alleviate the seriousness of this problem, electrode assemblies have been constructed with the tubular stem being L-shaped so that the electrode can be inserted horizontally into the medium to be investigated. However, this electrode structure is not readily usable in other types of applications, and because of its shape is a rather impractical and easily breakable device.

Another expedient which has been suggested as a solution for this problem is the use of an electrolyte in gel form. This is accomplished by pouring hot electrolyte, to which a gel-forming substance such as agar-agar has been added, into the tubular stem of an electrode assembly and letting this mixture solidify with the electrode assembly kept at an angle such that the electrolyte wets the membrane. The electrode assembly can then be used at any orientation. This method has certain disadvantages, however. Addition of a gel-forming agent may adversely affect the electrical characteristics of the electrolyte, and furthermore it has been found that an electrolyte in the form of a gel sometimes will not wet a membrane as effectively as a liquid electrolyte. In addition, many gels are temperature sensitive, liquifying at elevated temperatures.

According to the present invention, it has now been found that an electrode assembly usable in any physical orientation may be constructed by providing an electrolyte-containing enclosure having only one small opening, so that the surface tension of the liquid adjacent the opening is sufficient to prevent flow of the liquid electrolyte therethrough under the influence of a gravitational field. The small hole is sufficiently large to allow the passage of the thin open-ended tube such as the needle of a hypodermic syringe therethrough for filling purposes and furthermore acts as a vent in the event of an undesirable pressure buildup within the enclosure.

It is therefore a primary object of the present invention to provide an electrolyte assembly of practical configuration that can be used at an angle and does not require the addition of solidifying agents to the electrolyte.

It is a further object of the present invention to provide such an electrode assembly at no appreciable increase in cost over those presently available.

These and further objects and advantages of the invention will become more apparent upon reference to the following specification and claims and appended drawing wherein:

FIG. 1 is a longitudinal section through a glass electrode assembly according to a first embodiment of the present invention; and FIG. 2 is a longitudinal section through an electrode assembly according to another embodiment of the present invention.

Referring now to FIG. 1, there is shown a glass electrode assembly having a hollow glass stem 11 comprising an outer tubular member 12 and a substantially concentric inner tubular member 13, these members thus defining an annular space within the stem 11. The upper end of the outer tubular member 12 is interconnected with the inner tubular member 13 and the other end of the member 12 is sealed by a pH sensitive glass membrane 14. Both portions of the stem 11 are made of a glass having a high electrical resistance and desirable physical properties, such as relatively high strength and a coefficient of thermal expansion that allows sealing of a pH sensitive membrane thereto. For pH measurements, glass electrodes of this type are used in conjunction with a reference electrode. In such measurements, the glass electrode assumes a potential that is a function of pH and the reference electrode assumes a potential that is substantially independent of the ionic composition of the sample.

The upper end of the glass stem 11 is covered by a plastic cap 15 which allows manipulation of the glass electrode assembly and protects an electric cable 16 by means of which the electrode assembly is connected into any suitable circuit. The electric cable 16 extends through the cap 15 into the interior of the tubular member 13 and includes a conductive wire 17 that is surrounded by an insulating sheet 18 which in turn is surrounded by a braided shield 19 and a second insulating sheet 20.

The end of the wire 17 is soldered to one end of a platinum wire 21 which is sealed into and extends through the tapered end of the inner tubular member 13. The junction of the lead 17 and the platinum wire 21 is protected against mechanical damage by a small body 22 of a sealing compound such as asphalt wax or a suitable epoxy resin. If desired, the body 22 may be solder which will then form the soldered connection between the wires 17 and 21. The other end of the platinum wire 21 is fused or otherwise connected to one end of a silver wire 23, the other end 24 of which acts as the internal electrode for the glass electrode assembly. The electrode 24 may be a silver-silver chloride electrode of the type disclosed in copending application Serial No. 718,826, filed March 3, 1958, and assigned to the assignee of the present invention, or one of the electrodes mentioned therein as prior art electrodes.

According to the present invention, the outer tubular member 12 of the stem 11 is provided with an inwardly directed annular projection 25 which defines a capillary constriction 26 in the interior of the stem and divides the interior of the stem into upper and lower compartments.

The diameter of this constriction should be large enough to allow passage of an injection needle for introducing an electrolyte 27 into the lower compartment of the stem adjacent the membrane 14, and small enough to prevent flow of the electrolyte from this portion of the stem under the influence of a gravitational field, for example, when the electrode is held with its longitudinal axis horizontal or when the electrode is held upside down. A diameter of 1.5 millimeters has been found quite satisfactory when it is desired to utilize the electrode assembly in any physical orientation but under otherwise normal conditions. A smaller diameter may be required when the electrode must remain operable even while undergoing severe accelerations in any direction.

The embodiment of the electrode assembly shown in FIG. 1 is assembled as follows: The inner and outer tubular members are first made as separate elements, the inner tubular member being provided with the fused in platinum wire 21 and the outer tubular member with the annular projection 25. The compartment of the stem 11 defined by the membrane 14, tubular member 12 and projection 25 is then filled with electrolyte or filling solution by means of a hypodermic syringe, the needle thereof being inserted into this enclosure through the constriction 26. Filling is continued to a level slightly higher than constriction 26 and thereafter the outer tubular member 12 is fused to the flange of the inner tubular member 13 to complete the glass assembly.

Prior to the fusing together of the two tubular members, the silver wire 23 and its associated electrode 24 is connected to the platinum wire 21. The connection of the other end of the platinum wire 21 to the wire 17 is made after the members 12 and 13 are fused together. As a last step, the plastic cap 15 is fitted in place to protect the upper end of the electrode and hold the cable 16.

The glass electrode assembly shown in FIG. 1 may be operated at any physical orientation, the electrolyte being retained in the compartment of the stem below the projection 25 because the surface tension of the liquid adjacent the constriction 26 will serve to keep the liquid in place even when the electrode assembly is turned upside down. The gas volume that is permanently enclosed in the substantially annular space between the tubular members 12 and 13 is large enough to absorb forces generated in the lower portion of the stem because of unequal thermal expansion coefficients of the electrolyte or filling solution and the glass. Should the electrolyte completely fill this space, such forces might damage the membrane or disturb the electrode characteristics.

FIG. 2 shows an electrode assembly according to a second modification of the present invention which is suitable for the measurement of carbon dioxide content in gases. Broadly, the carbon dioxide sensing electrode comprises a pH sensitive glass electrode having a sensitive glass membrane in contact with one surface of a liquid film, the other surface of which is in contact with one side of a gas-permeable membrane. The other side of the gas-permeable membrane is exposed to the gas or the medium to be analyzed. In the body of electrolyte of which the film forms a portion, there is disposed a reference electrode which may be composed of, for example, silver-silver chloride. Carbon dioxide to be detected permeates the membrane and changes the pH of the liquid film. As a result, a potential is generated across the glass membrane and can be measured in the usual way by means of a high input impedance circuit.

The construction of the embodiment of the invention shown in FIG. 2 is similar in many respects to that of FIG. 1. The electrode assembly generally indicated at 30 includes a central glass stem 31 functionally identical to the stem 11 of FIG. 1. The stem 31 includes an outer tubular member 32 and a substantially concentric inner tubular member 33, these members defining an annular space within the stem 31. The upper ends of the tubular members 32 and 33 are joined in the same fashion as shown in FIG. 1. The other end of the outer tubular member 32 is sealed by a pH sensitive glass membrane 34. The portion of the tubular member 32 adjacent the glass membrane 34 is provided with a flared-out portion 35 for reasons that will be explained more completely hereinbelow.

An electrical cable 36 similar to the cable 16 of FIG. 1 extends into the interior of the inner tubular member 33 and has extending therefrom a wire 37. The end of the wire 37 is soldered to one end of a platinum wire 38 which is sealed into and extends through the tapered end of the inner tubular member 33. The junction of the wire 37 and the platinum wire 38 is protected against mechanical damage by a small body 39 of a sealing compound which may, if desired, be solder. The other end of the platinum wire 38 is fused or otherwise connected to one end of a silver wire 40, the other end 41 of which acts as the internal electrode for the glass electrode assembly. This electrode 41 is similar to electrode 24 of FIG. 1.

The outer tubular member 32 of the stem 31 is provided with an annular recess 42 which defines a capillary constriction 43 similar to the constriction 26 of FIG. 1. This constriction could, of course, be equally well defined by an inwardly directed annular projection in the tubular member 32 similar to the projection 25 in FIG. 1. As in FIG. 1, the diameter of the constriction should be large enough to allow passage of an injection needle for introducing an electrolyte 44 such as a buffer solution into the lower compartment of the stem adjacent the membrane 34, and small enough to prevent flow of the electrolyte from this portion of the stem under the influence of a gravitational field. The filling is continued until the electrolyte reaches a level slightly above the constriction. A suitable diameter for the constriction 43 has been found to be 1.5 millimeters although a smaller diameter may be required when large adversely directed gravitational fields may be encountered.

After the glass stem 31 has been constructed, it is inserted into a tubular casing 45 which is provided with an annular recess 46 at its lower end. The lower end of the glass casing 45 is open but is covered by a suitable gas-permeable membrane 47 held in place by a rubber O-ring 48 which is seated in the annular recess 46. The recess 46 geometrically cooperates with the flared-out portion 35 of member 32 so that a thin film of liquid can be formed between the membrane 34 and the membrane 47.

The casing 45 is also provided with an annular recess 49 near its upper end. This recess makes close contact with the wall of the outer tubular member 32 of the glass stem 31. In order that a good seal be formed, the space between the outer casing 45 and the tubular member 32 above the recess 49 is filled with a suitable potting compound 50. This compound 50 also performs the function of the cap 15 of FIG. 1, that is, it protects the glass stem 31. The whole electrode assembly 30 is covered by a cap 51 of any suitable material.

A second electrode 52, similar in structure to electrodes 41 and 24, is positioned in the annular space between the casing 45 and the glass stem 31 by means of a conductor 53 which passes between the walls of these members and through the potting compound 50 and is connected inside the cap 51 to a second electric cable 54. This electrode serves as the reference electrode previously referred to. The cables 36 and 54 enable the electrode assembly to be connected into a suitable measuring circuit.

A suitable electrolyte 55 such as potassium chloride is introduced into the annular space between the casing 45 and the glass stem 31 by means of a capillary hole 56 in the wall of the member 45. The electrolyte 55 forms a film between the membrane 47 and the pH sensitive member 34 whose pH will be changed by the presence of the carbon dioxide to be detected.

The hole 56 should be large enough to allow passage of the needle of a hypodermic syringe therethrough but small enough so that the surface tension of the electrolyte 55 at this hole will prevent the escape of electrolyte when the electrode assembly is turned upside down or otherwise under the influence of a gravitational field. A suitable diameter for the hole 56 is 1.5 millimeters; however, smaller diameters may be used as required.

The hole 56 also serves to prevent the creation of internal pressures due to unequal thermal coefficients of expansion of the liquid 55 and the glass members of the electrode assembly. In the absence of the hole 56, such pressures could cause changes in the dimensions of the liquid film disposed between the glass membrane 34 and the gas-permeable membrane 47 which changes would disturb the accurate performance of the electrode assembly. The constriction 43 in the tubular member 32 serves the same purposes as described with respect to the constriction 26 of FIG. 1.

As can be seen from the above description, the present invention provides electrode assemblies useful in any physical orientation and thus extremely well adapted for physiological measurements. The electrode assemblies of the present invention are not adversely affected by use in mediums having varying temperatures and can be provided at no appreciable increase in cost over those heretofore used.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. An electrode assembly for chemical analysis adapted to be used in any physical orientation, comprising:
   a hollow tubular member, said tubular member having a constriction intermediate the ends thereof, said constriction defining an open capillarly passage providing pressure communication between opposite sides of said constriction;
   a pH sensitive glass membrane sealingly connected to one end of said tubular member; said membrane, said constriction and the wall of said tubular member defining a first compartment in said tubular member;
   a cap on the other end of said tubular member; said cap, said constriction and the wall of said tubular member defining a second compartment in said tubular member;
   a body of liquid electrolyte substantially completely filling said first compartment;
   and an electrode positioned in said first compartment in contact with said electrolyte;
   said open capillary passage being sufficiently small to prevent flow of said electrolyte from said first compartment to said second compartment solely under the influence of gravity;
   and means adapted to couple said electrode in an electrical circuit.

2. An electrode assembly for chemical analysis adapted to be used in any physical orientation, comprising:
   a hollow tubular member having a pH sensitive glass membrane covering one end thereof;
   said member having a constricted portion intermediate the ends thereof dividing said member into two compartments, said constricted portion defining an open capillary passage providing pressure communication between said two compartments;
   a body of liquid electrolyte in contact with said membrane and substantially completely filling the one of said two compartments having said glass membrane;
   said open capillary passage being sufficiently small to prevent flow of said electrolyte from said one of said two compartments to the other of said two compartments solely under the influence of gravity;
   and an electrode supported in said one of said two compartments in contact with said electrolyte.

3. The assembly of claim 2 wherein the diameter of said passage is about 1.5 millimeters.

4. An electrode assembly for chemical analysis adapted to be used in any physical orientation comprising:
   a first hollow tubular member;
   a second hollow tubular member, said second tubular member being located inside said first tubular member and coaxial therewith whereby an annular electrolyte reservoir is defined between said members;
   one end of said first member being covered with a gas-permeable membrane;
   one end of said second member adjacent said one end of said first member being covered with a pH sensitive glass membrane, said gas-permeable membrane covering such glass membrane and being closely adjacent thereto to define an electrolyte film space;
   said second tubular member having a constricted portion intermediate the ends thereof dividing said member into two compartments, said constricted portion defining an open capillary passage providing pressure communication between said two compartments;
   the one of said two compartments having said glass membrane being adapted to be substantially completely filled with a body of liquid electrolyte;
   said open capillary passage being sufficiently small to prevent flow of said electrolyte from said one of said two compartments to the other of said two compartments solely under the influence of gravity;
   a first electrode supported in said one of said two compartments and being adapted to be in contact with the electrolyte therein;
   a second electrode supported in said annular electrolyte reservoir;
   and means for closing the upper ends of said members.

5. The assembly of claim 4 wherein a capillary opening is provided in said first tubular member near the upper end thereof.

6. The assembly of claim 5 wherein the capillary opening defined by the constricted portion of the second tubular member and the capillary opening in the first tubular member have diameters not exceeding 1.5 millimeters.

7. An electrode assembly for chemical analysis adapted to be used in any physical orientation, comprising:
   a hollow tubular member having a pH sensitive glass membrane covering one end thereof;
   said member having a constricted portion intermediate the ends thereof dividing said member into two compartments, said constricted portion defining an open capillary passage providing pressure communication between said two compartments;
   the one of said two compartments having said glass membrane being adapted to be substantially completely filled with a body of liquid electrolyte;
   said open capillary passage being sufficiently small to prevent flow of said electrolyte from said one of said two compartments to the other of said two compartments solely under the influence of gravity;
   and an electrode supported in said one of said two compartments and being adapted to be in contact with the electrolyte therein.

8. The assembly of claim 7 wherein the diameter of said passage is about 1.5 millimeters.

9. An electrode assembly for chemical analysis adapted to be used in any physical orientation, comprising:
- a hollow tubular member, said tubular member having a constriction intermediate the ends thereof, said constriction defining an open capillary passage providing pressure communication between opposite sides of said constriction;
- a pH sensitive glass membrane sealingly connected to one end of said tubular member; said membrane, said constriction and the wall of said tubular member defining a first compartment in said tubular member adapted to be substantially completely filled with a body of liquid electrolyte;
- a cap on the other end of said tubular member; said cap, said constriction and the wall of said tubular member defining a second compartment in said tubular member;
- said open capillary passage being sufficiently small to prevent flow of said electrolyte from said first compartment to said second compartment solely under the influence of gravity;
- an electrode positioned in said first compartment and being adapted to be in contact with said electrolyte; and means adapted to couple said electrode in an electrical circuit.

References Cited by the Examiner

UNITED STATES PATENTS

| | | | |
|---|---|---|---|
| 2,693,499 | 11/54 | Neumann | 136—177 |
| 2,755,243 | 7/56 | Beckman et al. | 204—195.1 |
| 2,913,386 | 11/59 | Clark | 204—195 |
| 3,000,804 | 9/61 | Cahoon et al. | 204—195 |
| 3,126,328 | 3/64 | Hutchison et al. | 204—195 |

FOREIGN PATENTS

| | | |
|---|---|---|
| 603,671 | 8/60 | Canada. |
| 1,090,451 | 10/60 | Germany. |

OTHER REFERENCES

Beckman Instructions No. 1134, August 1960.

Hackh's Chemical Dictionary, 3rd. edition, 1944, page 164.

WINSTON A. DOUGLAS, *Primary Examiner.*

MURRAY TILLMAN, JOHN R. SPECK, *Examiners.*